Aug. 27, 1968
A. O. MISCHKE
3,398,496
CLAMPING CONNECTION
Filed Sept. 24, 1964
2 Sheets-Sheet 1
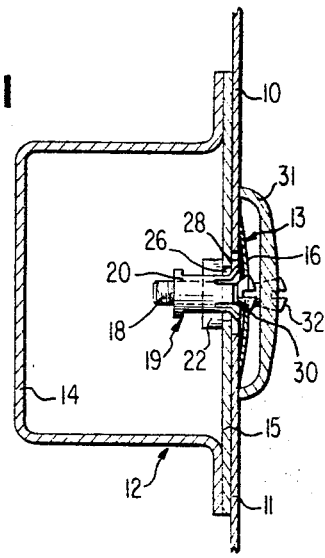
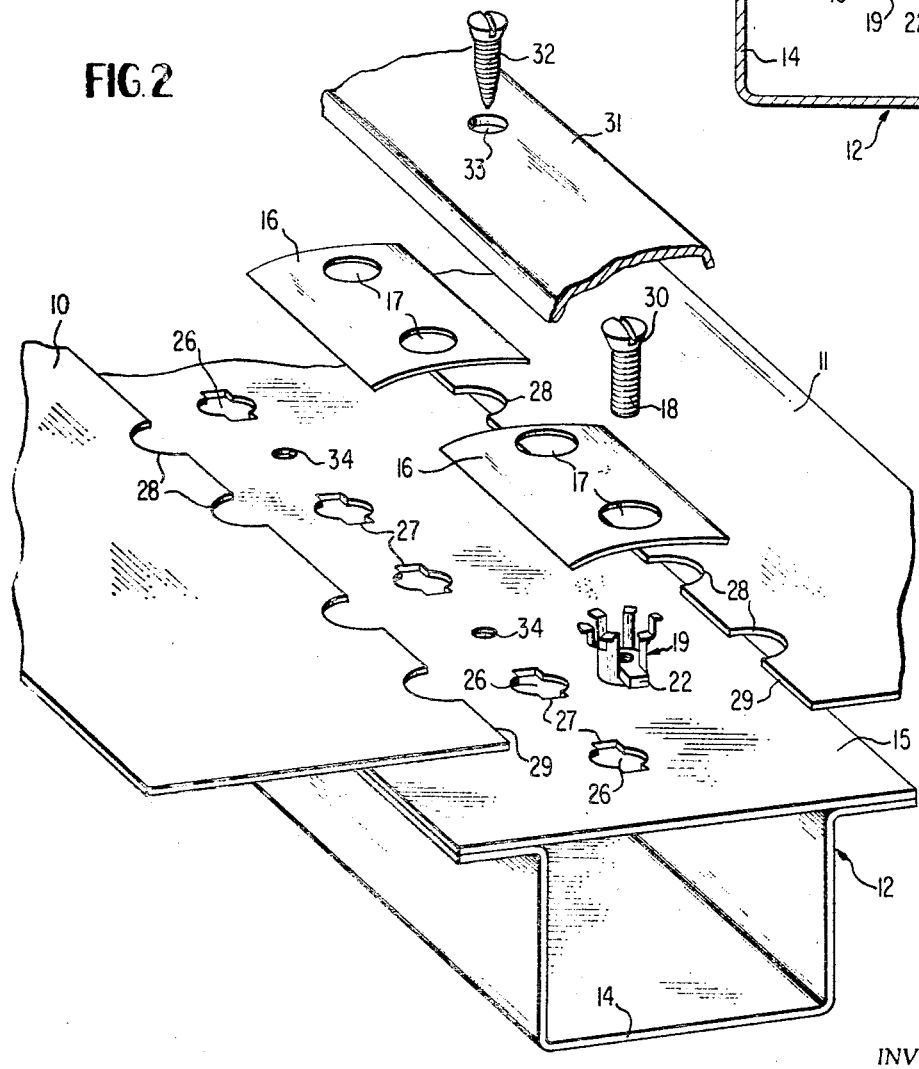
INVENTOR.
ARTHUR O. MISCHKE
BY Dicke & Craig
ATTORNEYS Aug. 27, 1968     A. O. MISCHKE     3,398,496

CLAMPING CONNECTION

Filed Sept. 24, 1964     2 Sheets-Sheet 2

INVENTOR.
ARTHUR O. MISCHKE

BY *Dicke & Craig*

ATTORNEYS

United States Patent Office 3,398,496
Patented Aug. 27, 1968

3,398,496
CLAMPING CONNECTION
Arthur O. Mischke, Ruit, Kreis Esslingen, Germany, assignor to Daimler-Benz Aktiengesellschaft, Stuttgart-Unterturkheim, Germany
Filed Sept. 24, 1964, Ser. No. 398,848
Claims priority, application Germany, Sept. 27, 1963,
D 42,577
1 Claim. (Cl. 52—463)

ABSTRACT OF THE DISCLOSURE

A clamp-type connection between two or more sheet metal parts, comprising a relatively fixed part, a clamping spring member, a channel-shaped cover strip resiliently retaining the clamping spring member, and a clamping screw in threaded engagement with the clamping spring member and with an aperture in the relatively fixed part, and having a head which overlies the cover strip, thus securing the clamping spring and the cover strip to the relatively fixed part with the sheet metal parts being thus secured between flange portions of the clamping spring member and the surface of the relatively fixed part.

The present invention relates to a clamp-type connection between two parts, and more particularly relates to a clamp-type connection of two or more sheet metal body parts of motor vehicle bodies with each other and with bearer parts.

By reason of the heavy loads to which the vehicle bodies are subjected and exposed during operation in constant change, the connections of the sheet metal body coverings or panels with the body framework frequently tend to become quickly disengaged or unfastened. In addition to the shocks and torsional forces coming from the road surface, thermal loads also have to be considered in connection therewith, especially when the bodies, for example, after the painting, are subjected to a drying treatment. Additionally, the prior art connections by screwing, riveting or spot-welding have the disadvantage that the body panels or coverings bulge out or become dented at the connecting places, aside from the fact that with a riveted or welded connection a subsequent disconnection of the sheet metal body panels or coverings for possible repair purposes is not feasible without destruction of the connections and without damage to the parts connected with one another.

Summary of the invention

In contrast to these prior art devices, the present invention contemplates a connection of sheet metal parts with one another, or with frame members or attachments thereto, which provides greater durability and resistance to destructive impact and thermal forces, to minimize disengagement and deformation of the sheet metal parts. At the same time, the connection according to the present invention represents an assembly which is simple to attach and detach and one which is relatively inexpensive to produce.

The arrangement may also serve for the clamp-type connection of two sheet metal parts, with or without a junction gap, whereby a cover element, such as a strip, covers the clamping springs as well as the junction gaps.

A connection in accordance with the present invention may be applicable for purposes other than bus vehicle bodies, such as structural steel work and machine manufacture, and offers, in such applications, all of the following advantages:

Disengagement of the clamping connection, even under heavy dynamic loads, is practically impossible.

A connection based solely on the clamping effect allows for expansion of the sheet metal parts upon heating, without damage thereto. Thus, the formation of wrinkles and dents in the sheet metal parts, by exposure to the sun's rays or to the baking of the paint drying process to which vehicle bodies are subjected, is substantially eliminated.

Shadow formations and bulging or denting effects, as occur in particular in riveted and spot-welded connections about the individual rivets and spot-welds after the painting, are avoided by the present invention.

A simple and easy interchangeability of damaged sheet metal parts is feasible.

A significant cost reduction may be realized with a construction according to the present invention, particularly as compared to rivet connections which require very small rivet spacing.

In using cover elements, the latter may be secured to the bearer parts either by means separate from the clamping screws for the clamping springs or, in a simplified construction, by these clamping screws with the interposition of the sheet metal parts. The clamping screws may be utilized thereby in connection with blind nuts, and with bearer parts consisting of hollow sectional members. Furthermore, especially with a securing of the cover elements constructed in the form of cover strips by means of the clamping screws for the clamping springs, the cover elements may be provided with guide parts for the correspondingly constructed clamping springs, for example, for clamping springs which are S-shaped in cross section. Additionally, the clamping springs may simultaneously be constructed as screw locking devices.

Accordingly, it is an object of the present invention to provide a connection of two parts, especially of two or more sheet metal body panels with the bearer parts of the body, which is simple in construction and easy to install yet effectively eliminates the aforementioned drawbacks and shortcomings encountered with the prior art constructions.

Another object of the present invention resides in the provision of a connection for sheet metal parts in which unsightly deformations of the connecting places are effectively avoided.

A further object of the present invention resides in the provision of a clamping-type connection for the sheet metal panels of the body of a vehicle in which the connections thereof may be loosened again in case of repairs without destroying the connections.

Another object of the present invention resides in the provision of a connection for the sheet metal panels of motor vehicles, especially buses, which excels by safety and durability against all forces and loads that normally occur in the vehicle such as road forces, thermal stresses, etc. without producing undesirable deformations in the sheet metal parts.

Still another object of the present invention resides in the provision of a clamping-type connection for the sheet metal body panels or coverings of vehicles, especially buses, which excels by simplicity in assembly, low cost in manufacture and high resistance against unloosening by forces that normally occur during operation of the vehicle.

These and further objects, features and advantages of the present invention will become more obvious from the following description when taken in connection with the accompanying drawing which shows, for purposes of illustration only, two embodiments of the clamping connection in accordance with the present invention for the vehicle body panels or coverings of a bus body, and wherein;

FIGURE 1 is a cross sectional view through one embodiment of the clamping connection in accordance with the present invention with a securing of the cover strip by securing means separate from the securing means for the clamping spring;

FIGURE 2 is a perspective, exploded view of the clamping connection of FIGURE 1, illustrating the individual parts thereof.

Figure 2A:
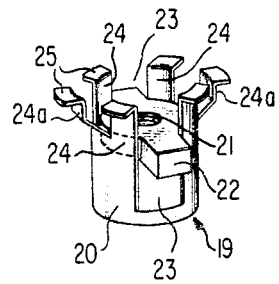
FIGURE 2a is a perspective view, on an enlarged scale, of the blind nut assembly in accordance with the present invention.

Referring now to the drawing wherein like reference numerals are used throughout the various views to designate like parts, and more particularly to the embodiment of FIGURES 1, 2, and 2a, reference numerals 10 and 11 designate therein the two sheet metal parts, forming for instance body panels or coverings which are secured on the relatively-fixed profile or sectional member generally designated by refernece numeral 12 of the body framework by means of the clamp-type connection generally designated by reference numeral 13. The sectional member 12 is thereby constructed as a hollow sectional member and consists of a U-shaped bearer 14 having lateral flanges by means of which it is connected with sheet metal cover plate 15.

Each of the clamping connections, of which one is illustrated in FIGURES 1 and 2 with all the parts thereof, includes a clamping spring 16 in the form of a bent plate provided with apertures 17, a clamping screw 18 and a blind nut assembly generally designated by reference numeral 19 having a cylindrical outer part 20 and a cross member 22 provided with a threaded bore 21. The cross member 22 may thereby be securely connected with the outer part 20, may form one piece therewith or may be axially movably guided, for example, in the slots 23 of the outer part 20. The outer part 20 is subdivided by these slots 23 as well as by further slots into individual springy lugs or prongs 24 and 24a which at the ends 25 thereof, are angularly bent outwardly either rectangularly or obliquely. The prongs 24a, offset or displaced with respect to the cross member 22 by 90° are, in contrast to the remaining prongs, directed obliquely toward the outside.

For purposes of receiving the blind nuts 19 together with the clamping screws 18, the cover plate 15 is provided with apertures 26 having grooves 27; furthermore, the sheet metal cover panels 10 and 11 are provided with corresponding semi-circularly shaped apertures 28.

During assembly the sheet metal parts 10 and 11 are placed upon the cover plate 15 of the sectional member 12 so that they abut closely with the edges thereof or are disposed opposite one another with a given joint gap and the apertures 28 come to lie over the apertures 26. Thereupon the clamping springs 16 together with the clamping screws 18 are inserted into the clamping spring 16 and, with blind nuts screwed onto the clamping screws 18, are installed in that the blind nuts 19 are inserted through the apertures 26 and the cross members 22 thereof through the grooves 27 and are thereupon rotated by 90° in a bayonet-like manner such that the cross members 22 extend underneath the edges of the apertures 26 and the prongs 24a engage into the grooves 27. The blind nuts 19 are thereby secured against rotation with respect to the sectional member 12. The clamping screws 18 are thereupon tightened until the cross member 22 abuts from the inside thereof securely against the cover plate 15 of the sectional member 12 whereas the head 30 of the screw 18 presses apart the springy ends 25 of the prongs 24 and thereby clamps the nut 19 and screw 18 against one another. As a result of this pressing action of the clamping springs 16 against the sheet metal parts 10 and 11, the latter are pressed by the clamping pressure against the sectional member 12 and simultaneously therewith the clamping screws 18 are secured against unscrewing or loosening thereof.

The clamping connections may be provided in any desired appropriate number. They are covered or bridged by a cover strip 31 which is to be secured at the cover plate 15 of the sectional member 12 by individual sheet metal screws 32 extending between adjacent ends of clamping springs 16.

For purposes of receiving the screws 32 the cover strip 31 is provided with apertures 33 and the cover plate 15 of the sectional member 12 with threaded apertures 34. If not permitted by the gap between the parts 10 and 11, appropriate apertures may also be provided in the latter to receive the screws 32.

Figure 3:
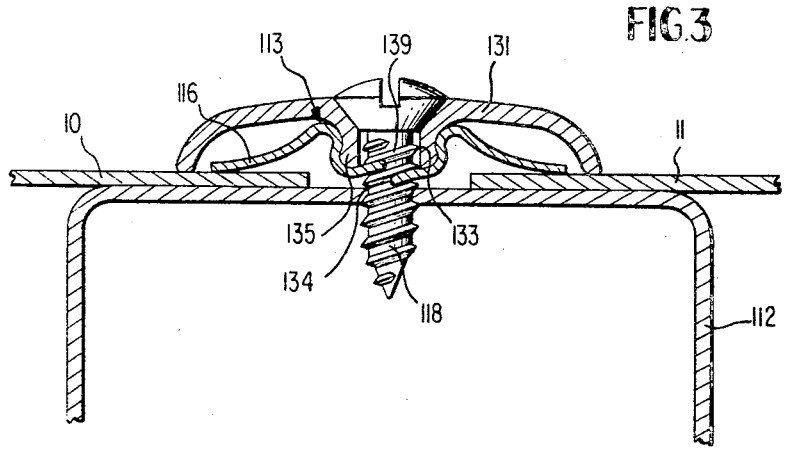
FIGURE 3 is a cross sectional view through a modified embodiment of a clamping connection in accordance with the present invention with a common securing means for the clamping springs and cover strip.
Figure 4:
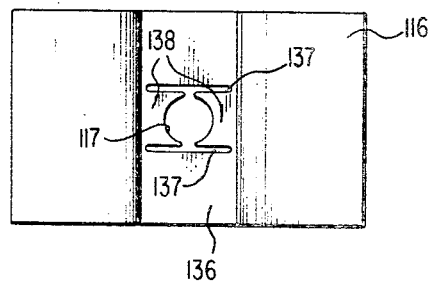
FIGURE 4 is a plan view of the clamping spring used with the embodiment of FIGURE 3.

In the embodiment of FIGURES 3 and 4, the sheet metal parts 10 and 11 are secured to the sectional member 112 by a clamping connection generally designated by reference numeral 113 which includes also the cover strip 131. The cover strip 131 includes a dovetailed guide strip 135 with which the punched-out clamping spring 116, bent for that purpose into S-shape in cross section, is springly or elastically in engagement. In the S-shaped bent center part 136 of the clamping spring 116 enclosing the center opening 117, tongues 138 are effectively formed by the slots 137 which tongues engage into the thread 139 of the clamping screw 118; preferably, a sheet metal screw. The latter is thereby inserted into the bore 133 of the cover strip 131 and is threaded into the bore 134 of the sectional member 112.

Upon tightening of the clamping screw 118 the clamping spring 116 is clamped against the sheet metal parts 10 and 11 which, in turn, are pressed against the sectional member 112 and are thereby subjected to a clamping pressure. The clamping pressure is limited in that the cover strip 131 abuts with the rims thereof against the sheet metal parts 10 and 11. The guide strip 135 prevents a rotation of the clamping spring 116. By the engagement of the elastic or springy prongs 138 of the clamping spring 116 into the threads 139 of the clamping screw 118, the latter is simultaneously secured or locked against unscrewing. This embodiment is advantageous by virtue of its particular simplicity and possibility of inexpensive manufacture.

It should be clearly understood that the clamp-type connection herein described need not be utilized only for securing sheet metal parts. It could as well be employed for securing materials such as synthetic resin, glass, rubber, etc., in sheet form, to one another or to relatively fixed parts.

While I have shown and described two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claim.

I claim:
1. A wall construction comprising:
   a relatively-fixed member with a supporting surface having an aperture therein;
   sheet metal panels engaging said supporting surface of said relatively-fixed part, said panels being in coplanar relationship and spaced apart at their edges;
   cover strip means, including a web portion and flanges extending therefrom and being generally channel-shaped in cross-section and having an exposed surface and a concealed surface;
   said cover strip means bridging the space between the edges of said panels, the terminal portions of said flanges of said cover strip means engaging said sheet metal panels;
   elongated guide strip means integral with said web por- tion of said cover strip means; said guide strip means having an enlarged terminal end remote from said web portion and a reduced section in the region where said guide strip means is attached to said web portion of said cover strip means, said surface of said guide strip means thus being generally S-shaped in cross-section;

a first opening extending through said web portion of said cover strip means and through said guide strip means;

elongated spring metal clamping means engaging said guide strip means and having a centrally-disposed channel portion and flanges extending outwardly therefrom, the sides of said channel portion being generally S-shaped in cross-section and corresponding with the configuration of said guide strip means, said guide strip means being resiliently retained within said channel portion of said clamping means, the flanges of said clamping means extending toward said sheet metal panels and being in clamping engagement therewith, a second opening, through said channel portion of said clamping means, said second opening being bounded by at least a pair of deflectable tongues;

said first and second openings being aligned with said aperture; and threaded fastening means having a head overlying said exposed surface of said cover strip means, and a shank extending through said aligned aperture and openings and being in threaded engagement with the deflectable tongues of said clamping means and the walls of said aperture.

References Cited
UNITED STATES PATENTS

| | | | |
|---|---|---|---|
| 2,166,889 | 7/1939 | Churchill | 52—718 |
| 818,846 | 4/1906 | Ogden et al. | 52—462 |
| 1,636,764 | 7/1927 | Clay | 52—464 |
| 1,724,601 | 8/1929 | Kellogg | 52—467 |
| 2,113,067 | 4/1938 | McLaughlin | 52—463 |
| 2,113,067 | 4/1938 | Tinnerman | 85—32 |
| 2,552,782 | 5/1951 | Hall et al. | 85—32 |
| 2,784,759 | 3/1957 | Modrey | 151—41.75 |

FOREIGN PATENTS

| | | |
|---|---|---|
| 133,177 | 8/1902 | Germany. |
| 790,903 | 2/1958 | Great Britain. |

HENRY C. SUTHERLAND, *Primary Examiner.*